S. TAYLOR.
Brush Machine.
No. 3,593.
Patented May 17, 1844.
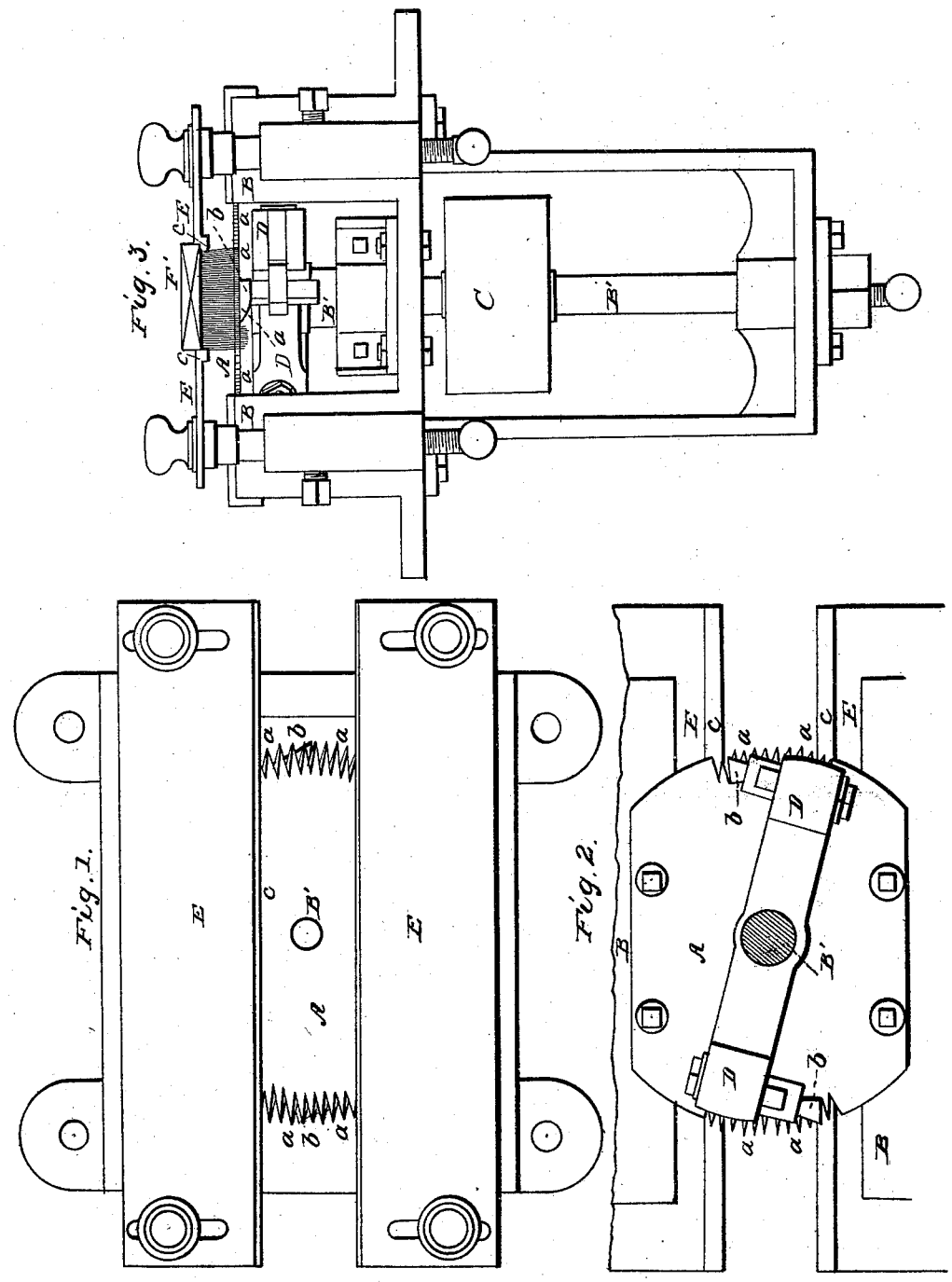

UNITED STATES PATENT OFFICE.

SAMUEL TAYLOR, OF EAST CAMBRIDGE, MASSACHUSETTS.

MACHINE FOR TRIMMING THE BRISTLES OF BRUSHES OR REDUCING THEIR ENDS TO ONE REGULAR PLANE OR CURVED SURFACE.

Specification of Letters Patent No. 3,593, dated May 17, 1844.

*To all whom it may concern:*

Be it known that I, SAMUEL TAYLOR, of East Cambridge, in the county of Middlesex and State of Massachusetts, have invented a new and useful Machine for Trimming the Bristles of Brushes or Reducing Their Ends to One Regular Plane or Curved Surface, and that the following description and accompanying drawings form a full and exact specification of the same.

Figure 1 represents a top view of my machine. Fig. 2 a bottom view of the cutter, and plate of teeth connected therewith, and Fig. 3, is an end elevation of the mechanism.

A, (Figs. 1, 2, 3) denotes a piece of saw plate, arranged in a horizontal position and attached firmly to a suitable metallic frame B. Each of the opposite edges of this plate has a series of long angular teeth $a, a, a, a$, &c., formed upon it—as seen in the drawing, or similar to the teeth of a saw, with the exception that each of them is made very much longer in proportion to its width at its root, than saw teeth generally are. One side of each of the teeth, or that toward which the cutters are moved, is sharpened or filed down to a sharp cutting edge, while the other side is left vertical or nearly so. The plate A, so constructed, is placed directly over a vertical arbor or shaft $B'$, suitably supported in bearings, and revolved by means of a band from any suitable driving power, passing around a pulley C, fixed thereon; or the said shaft may be put in motion by any other proper means. From the head or upper part of the shaft $B'$, one or more arms D, projects horizontally, each of said arms carrying a cutter $b$, which is suitably secured thereto, and which consists of a knife or chisel, whose sharp edge is placed close against, or nearly close against the lower sides of the teeth $a, a$, &c. and is in its length equal to, or greater than the length of the teeth $a$. The cutting edges of the teeth $a, a$, and each of the cutters $b$, have a relation to each other similar to those of a common pair of scissors or shears, and they are to be so beveled and otherwise disposed or arranged, that when any bristles are passed between the teeth $a, a$, and held in a vertical direction, a movement of the cutter $b$, in contact with the said bristles will cut them off in the same manner as they would be cut by the blades of a pair of shears, when placed between the same.

Directly above the plate A, of teeth, the horizontal guide bars E, E, are arranged at a distance asunder, corresponding or nearly corresponding to the width of the block of the brush, and with their inner edges parallel to each other. A narrow shelf or ledge C, is attached to the lower side of each of the guide bars, and projects a short distance beyond its inner edge as seen in the drawings. The upper side of the part of the ledge so projecting, and the inner vertical edge of the guide bar forms together, a rebate, which receives, retains and guides the block in which the bristles are inserted. The manner in which the block is received within the rebates of each guide bar, is shown in Fig. 3, where F, represents the block (or an end view thereof) resting within the guides. The guide bars should be supported in position by mechanism which will permit them to be moved nearer to, or farther from each other, and nearer to, and farther from the plate A, in order that the machinery may be adapted to cut off the bristles to such a distance from the block as may be desirable, and to receive blocks of any width.

In using the machine, the brush is placed within the guides, so as to rest upon their ledges, and is moved gradually toward the teeth of the plate A, and in such manner that the bristles at one end of the brush, will pass between the teeth and project below them. This being accomplished, the cutter shaft $B'$, is put in rapid revolution, and moves the cutters by, and beneath the teeth $a, a$, and thus severs or cuts off the bristles between the teeth. The operative moves the brush in a longitudinal direction between the guides, and continues so to move it, until all the bristles are acted upon, and thus reduced to a uniform or proper length.

I claim—

1. The apparatus or means of receiving and holding the bristles to be cut (the same consisting in a series of teeth $a, a, a$, &c, extending from a plate A, and having their edges or sides sharpened as before described) in combination with one or more revolving or movable cutters $b, b$, placed directly beneath the said teeth, and arranged and caused to pass in contact, or nearly in contact with them so as to act in connection therewith similar to scissors or shears, and cut or separate those parts of the bristles extending below the teeth, from the remainder or parts above them, and thereby reduce all the bristles of the brush as set forth.

2. And I also claim the combination with the above, of the mechanism for holding and guiding the block or brush, or presenting the bristles to the cutters and teeth, in such manner, as to cause them to reduce or cut the said bristles to a regular, or the requisite length; the said mechanism consisting of the adjustable rails, or guide bars E, E, arranged over the cutters and teeth, and in connection therewith substantially as before described.

In testimony that the above is a correct specification of my improvements I have hereto set my signature this third day of April in the year 1844.

SAMUEL TAYLOR.

Witnesses:
R. H. EDDY,
DAVID A. GRANGER.